(12) United States Patent
Lourette et al.

(10) Patent No.: US 6,515,760 B1
(45) Date of Patent: Feb. 4, 2003

(54) METHOD AND APPARATUS FOR MANIPULATING DIGITAL IMAGE DATA

(75) Inventors: Richard W. Lourette, Fairport, NY (US); David P. D'Aurelio, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/150,418

(22) Filed: Sep. 9, 1998

(51) Int. Cl.[7] .............................................. G06F 15/00
(52) U.S. Cl. ...................... 358/1.18; 358/450; 358/540
(58) Field of Search .............................. 358/1.12, 1.13, 358/1.14, 1.15, 1.16, 1.17, 1.18, 1.1, 448, 450, 452, 453, 540

(56) References Cited

U.S. PATENT DOCUMENTS

| | | | | |
|---|---|---|---|---|
| 4,979,096 A | | 12/1990 | Ueda et al. | |
| 5,333,246 A | * | 7/1994 | Nagasaka | 395/133 |
| 5,768,489 A | * | 6/1998 | Adachi et al. | 358/1.13 |
| 5,970,216 A | * | 10/1999 | Tanio et al. | 358/1.13 |
| 5,978,563 A | * | 11/1999 | Kawamoto et al. | 358/1.13 |
| 6,088,480 A | * | 7/2000 | Sakamoto | 382/238 |
| 6,205,259 B1 | * | 3/2001 | Komiya et al. | 382/284 |

FOREIGN PATENT DOCUMENTS

EP  0 687 993  12/1995

* cited by examiner

*Primary Examiner*—Mark Wallerson
(74) *Attorney, Agent, or Firm*—Frank Pincelli

(57) ABSTRACT

A method and apparatus for processing digital image data of an image. The digital data is divided up into a plurality of image segments and distributed to at least two image processing units. The image segments each have an overlapping region of the next adjacent image segment. The digital data is manipulated by each of the at least two image processing units at the same time and sent to a print engine interface unit as requested where the image is recombined.

40 Claims, 5 Drawing Sheets

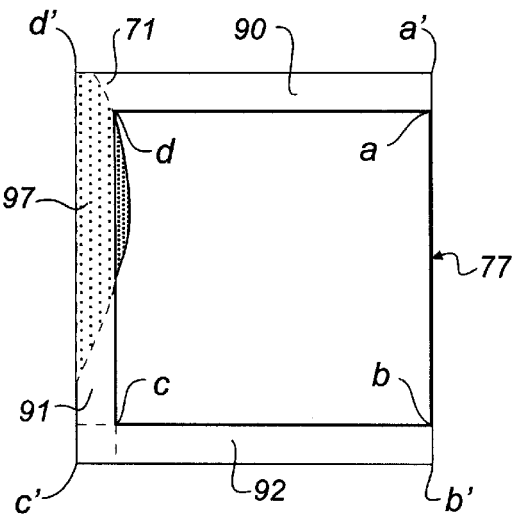
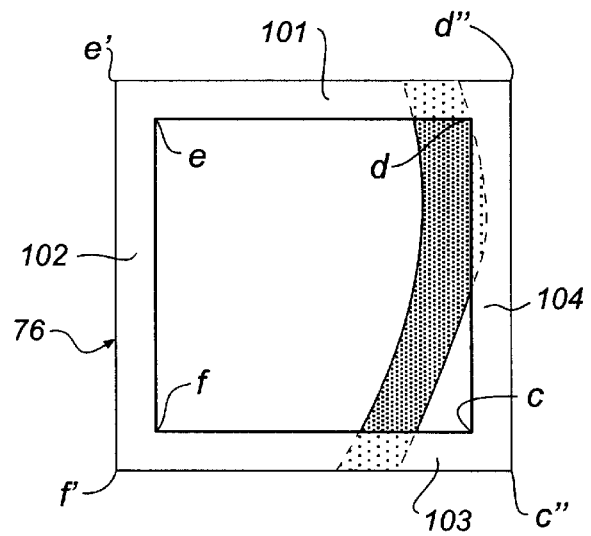
FIG. 5b  FIG. 5a
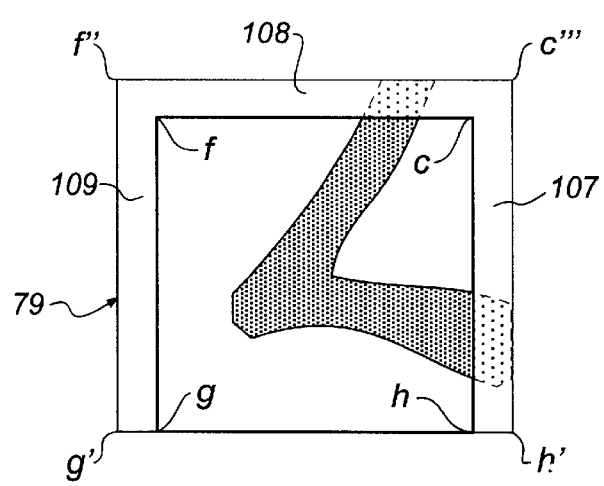
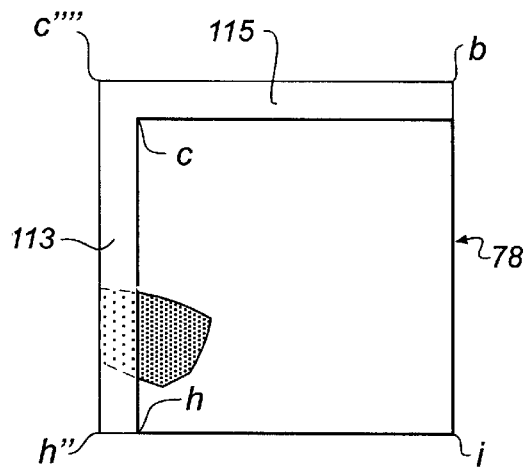
FIG. 5c  FIG. 5d

METHOD AND APPARATUS FOR MANIPULATING DIGITAL IMAGE DATA

FIELD OF THE INVENTION

The present invention relates to a method and apparatus for processing and/or manipulating digital image data of an image prior to printing of the image.

BACKGROUND OF THE INVENTION

It is well known that images captured in digital format may be manipulated and later printed by a variety of digital devices, for example, but not by way of limitation, thermal printers, laser printers, LED printers, as is currently used or may be developed. Many of these devices are directed to relatively low speed and/or resolution outputs, thus allowing the computer to have sufficient time to manipulate the image. However, quite often because of the amount of information needed to store the image and do the appropriate manipulation, a substantial amount of memory is required for processing of the image. This, of course, can add substantial cost to the device. In addition, this additional memory takes up valuable space. Furthermore, most methods of manipulating images prior to printing are directed to low speed/resolution output printers, or higher speed/resolution output printers. There is no common architecture for manipulating an image for a variety of different throughput-type printers. Thus, every time a new product comes out, there is required a new architecture for image manipulation. Furthermore, it is quite difficult to support real time image data processing for images that can keep up with the speed of even a moderate size printer.

Additionally, prior art devices have been dependent upon the size of the image in that only certain size images can be handled for processing and manipulation and sent to the printer.

The present invention solves many of the foregoing problems by providing a device which can be scaled up or down to either increase or decrease the amount of images or throughput without substantial cost, redesign or fabrication, and which can be easily expanded for increased or faster output. In addition, the present invention is not limited to a particular size image. It can be used to manipulate any size image and do so in real time, such that the printer can be printing the image as quickly as it is being completed.

SUMMARY OF THE INVENTION

The present invention is directed to overcoming one or more of the problems set forth above.

In accordance with one aspect of the present invention there is provided a method of processing digital image data of an image, comprising the steps of:

a) obtaining a digital record of an image;

b) segmenting the digital record into a plurality of image segments;

c) distributing the image segments to at least two image processing units;

d) manipulating each of the image segments of the digital record using the at least two image processing units; and e) recombining the image regions of each of the image segments for reformation of the image.

In accordance with another aspect of the present invention there is provided an apparatus for manipulated digital image data, comprising a central processing unit for managing a digital image record for at least one image, at least two image processing units in communication with the central processing unit, segmenting the digital record into a plurality of image segments and forwarding the image segment to the at least two image processing units, each of the image segments having an image region and an overlapping region with respect to adjacent segments, the at least two image processing units manipulating the image segments, the print engine interface unit obtaining information from the central processing unit such that appropriate digital data may be obtained from the at least two image processing units for combining of the image using the image region of each of the image segments and for forwarding the recombined image to a printing device.

In accordance with yet another aspect of the present invention there is provided a method of processing digital image data of an image, comprising the steps of:

a) obtaining a digital record of an image;

b) segmenting the digital record into a plurality of image segments, each of the plurality image segments comprising an image region and an overlapping region with respect to adjacent image segments;

c) distributing the image segments to at least two image processing units;

d) manipulating each of the image segments of the digital record by the at least two image processing units; and e) recombining the image regions of each of the image segments for reformation of the image.

In accordance with yet another aspect of the present invention there is provided an apparatus for manipulated digital image data, comprising a central processing unit for managing a digital record for at least one image, at least two image processing units in communication with the central processing unit, and a print engine interface unit in communication with the central processing unit, the central processing unit segmenting the digital record into a plurality of image segments for forwarding on to the at least two image processing units, each of the plurality of image segments comprising an image region and an overlapping region with respect to adjacent image segments, the at least two image processing units manipulate the image segments, the print engine interface unit obtaining information from the central processing unit such that appropriate digital data may be obtained from the at least two image processing unit, for recombining of the image using the regions of the plurality of image segments.

In accordance with yet another aspect of the present invention there is provided A method of processing digital image data of an image in a photographic printer, comprising the steps of:

a) obtaining a digital record of an image;

b) segmenting the digital record into a plurality of image segments, each of the image segments having an image region and an overlapping region with respect to adjacent image segments;

c) distributing the image segments to at least two image processing units;

d) the at least two image processing units manipulating each of the image segments of the digital record; and e) recombining the image regions of each of the image segments for reformation of the image.

In accordance with yet another aspect of the present invention there is provided A digital printer for printing onto a photographic material, the printer comprising a central processing unit for managing a digital image record for at least one image, at least two image processing units in communication with the central processing unit, and a print engine interface unit in communication with the central processing unit, the central processing unit segmenting the digital record into a plurality of image segments and forwarding the image segments to the at least two image processing units, each of the image segments having an image region and an overlapping region with respect to adjacent segments, the at least two image processing units manipulating the image segments, the print engine interface unit obtaining information from the central processing unit such that appropriate digital data may be obtained from the at least two image processing units for recombining of the image using the image regions of the plurality of image segments and for forwarding the recombined image to a device.

In accordance with yet another aspect of the present invention there is provided A method of processing digital image data of an image in a photographic printer, comprising the steps of:

a) obtaining a digital record of an image;

b) segmenting the digital record into a plurality of image segments, each of the plurality of image segments comprising an image region and an overlapping region;

c) distributing the image segments to at least two image processing units;

d) manipulating each of the image regions of the digital record by the at least two image processing units; and e) recombining the image regions of each of the image segments for reformation of the image.

In accordance with yet another aspect of the present invention there is provided A digital printer for printing onto a photographic material, comprising a central processing unit for managing a digital record for at least one image, at least two image processing units in communication with the central processing unit, and a print engine interface unit in communication with the central processing unit, the central processing unit segmenting the digital record into a plurality of image segments for forwarding on to the at least two image processing units, each of the plurality of the image segments having an image region and an overlapping region, the at least two image processing units manipulate the image segments, the print engine interface unit obtaining information from the central processing unit such that appropriate digital data may be obtained from the at least two image processing unit for combining of the image region of the plurality of image segments.

The above, and other objects, advantages and novel features of the present invention will become more apparent from the accompanying detailed description thereof when considered in conjunction with the following drawings.

BRIEF DESCRIPTION OF THE DRAWINGS

In the detailed description of the preferred embodiments of the invention presented below, reference is made to the accompanying drawings in which:

FIGS. 5a–d are enlarged views of four segments illustrated in FIG. 4 further illustrating how the segments are obtained for processing;

DETAILED DESCRIPTION OF THE INVENTION

The present description will be directed in particular to elements forming part of, or in cooperation more directly with, the apparatus in accordance with the present invention. It is understood that elements not specifically shown or described may take various forms well known to those skilled in the art.

Figure 1:
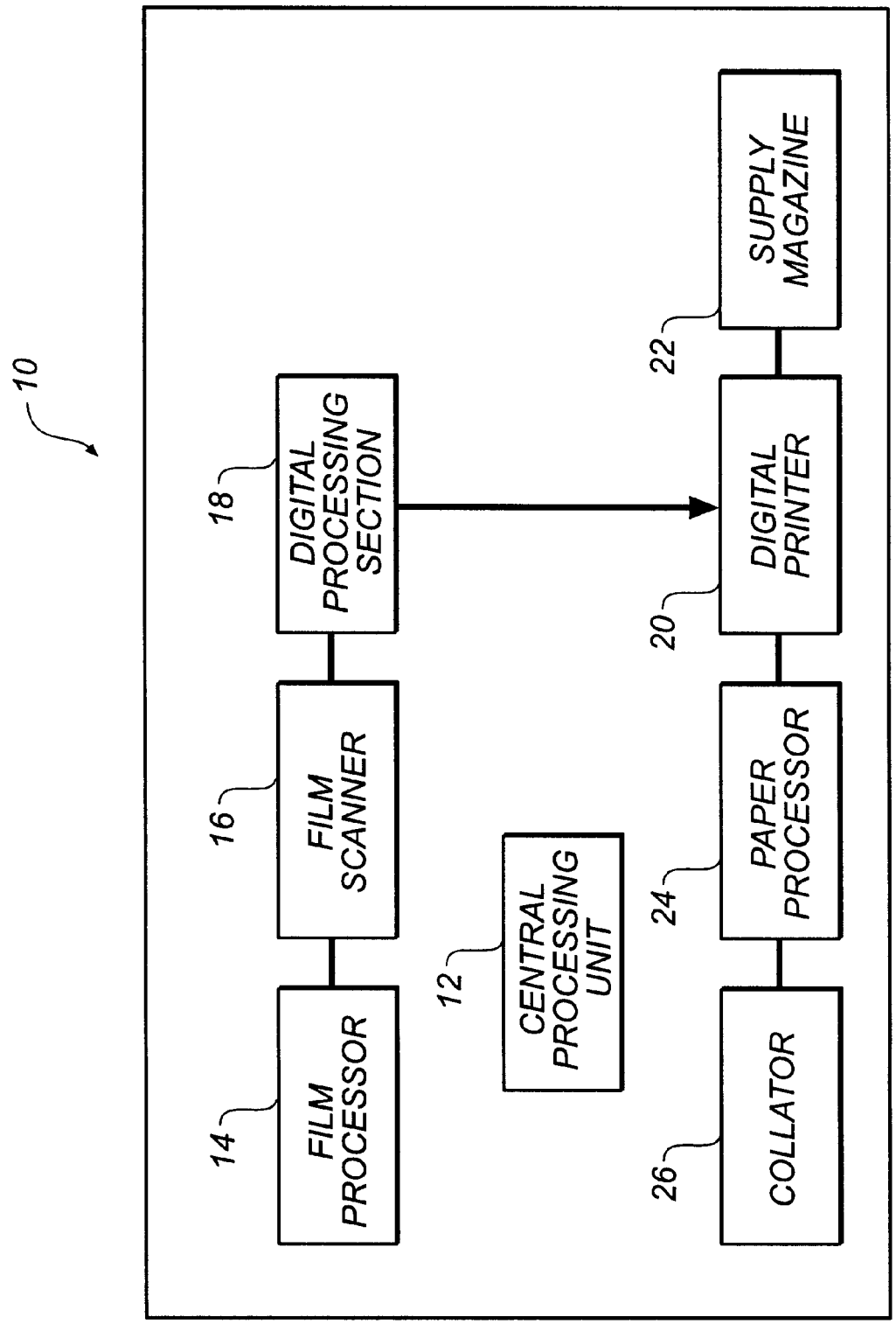
FIG. 1 is a schematic illustration of an apparatus made in accordance with the present invention.

Referring to FIG. 1, there is illustrated in schematic form, an apparatus 10 made in accordance with the present invention. In the particular embodiment illustrated, the apparatus 10 is an apparatus designed for use in the photographic industry and, in particular, in digital photographic printers wherein images are obtained and converted into digital form, processed and printed onto a photosensitive material at a relatively rapid rate. In the particular embodiment illustrated, the apparatus is a minilab and the photosensitive material is a photographic medium, in particular, photographic paper. However, it is to be understood that the apparatus 10 may take a variety of forms and is not limited to the particular embodiment illustrated. For example, but not by way of limitation, the apparatus 10 may comprise any type piece of equipment designed to manipulate images that have been provided in a digital format, which is then later used for displaying and/or printing of the image.

Apparatus 10 includes a central processing unit 12 for controlling the general operation of the apparatus 10. The apparatus 10 further includes a processor 14, which in the particular embodiment illustrated, is designed for developing exposed, undeveloped photographic film, such that the latent images thereon are developed. In the particular embodiment illustrated, a scanner 16 is provided for scanning of a photosensitive film that has been developed in processor 14 so as to obtain a digital record of the images formed thereon. The scanner 16 may be any desired type capable of obtaining a digital record of the images found thereon. In the particular embodiment illustrated, the scanner 16 includes an area-array charge coupled device (CCD) for scanning of the image as it is passed by the area-array for forming of the digital record of the image. The scanner then sends the digital record to a digital processing section 18 designed to manipulate the images in accordance with preprogrammed instructions provided in the digital processing section, or provided by CPU 12, which has been preprogrammed in accordance with instrumentation (or instructions) provided by the photofinishing lab, and/or by the customer requesting development of the photographic film and printing of the image. Once the images have been manipulated, they are forwarded to a digital printer 20, which prints the images on a photosensitive material provided from supply magazine 22, which in the particular embodiment illustrated, supplies photographic paper upon which the images are to be printed by printer 20. Any appropriate mechanism may be provided for transporting the material (for example, photosensitive material) in roll and/or cut sheet form to printer 20. In the particular embodiment illustrated, printer 20 is a laser printer, whereby images are printed onto the photosensitive material by scanning a light beam across the photosensitive material as it is moved through the printer. However, the images may be imparted to the photosensitive material by any other type digital printer, for example, as previously stated, but not by way of limitation, thermal and LED type printers. Once the photosensitive material has been printed thereon by printer 20, it is passed onto a second processor 24 wherein the photosensitive material provided from supply 22 is developed and dried, and then sent onto a collator 26 where the images are collated appropriately, whereby the operator then takes the printed images for packaging in appropriate envelopes for return to the customer.

Digital processing section 18 is designed such that images can be quickly and efficiently manipulated, such that the apparatus 10 may be a low volume throughput, a high volume throughput, or may be used to print on any desired size image required without having any perceivable, visual imperfection.

Figure 2:
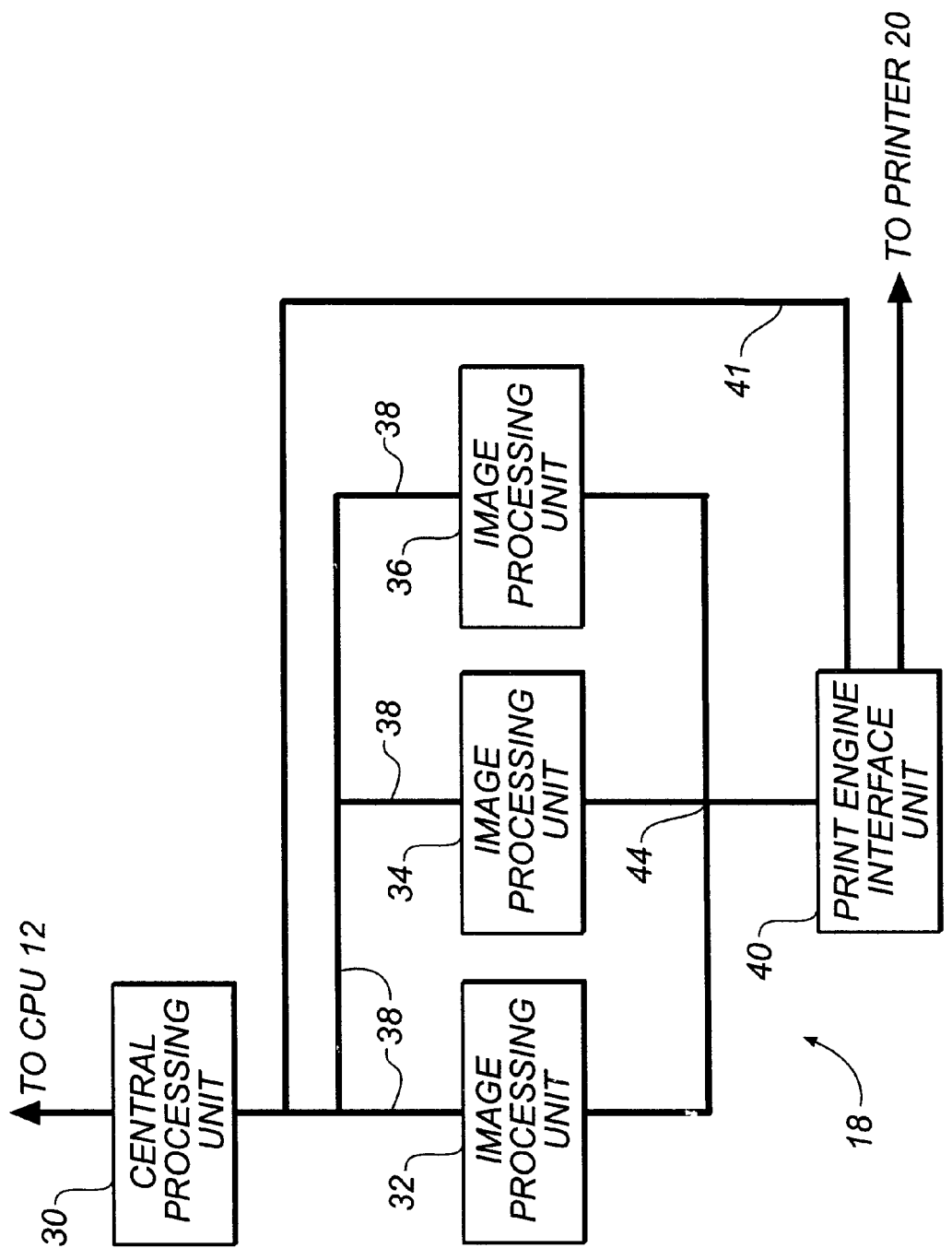
FIG. 2 is a schematic illustration of a system capable of manipulating digital data of images in accordance with the present invention and is utilized in the apparatus of FIG. 1.

Referring to FIG. 2, there is illustrated a digital processing section 18 made in accordance with the present invention. In particular, the digital processing section 18 includes a central processing unit 30, which is used for controlling operation of the digital processing section 18 and provides appropriate communication with the various components thereof. The central processing unit 30, is a typical computer processor, such as a Pentium processor, and is capable of being programmed as is conventionally well known to those skilled in the art. The central processing section 18 further includes a plurality of image processing units 32,34,36, each capable of performing digital manipulating of digital image data forwarded from central processing unit 30 which may take any desired form, such as a Pentium processor. The central processing unit 30 is appropriately connected to each of the image processing units 32,34,36 by appropriate bus connections as is well known to those skilled in the art.

The digital processing section 18 further includes a print engine interface unit 40 which is in communication with the central processing unit 30 through bus 41, and also is in communication to each of the image processing units 32,34, 36 by bus 44. The print engine interface is in communication with central processing unit 30, such that the desired data is appropriately pulled from each of the image processing units 32,34,36 as is required by the print engine interface unit 40. In the embodiment illustrated, print engine interface is a standard type PCI bus interface board which comprises logic devices, memory and analog circuitry required to convert the formatted digital image data into the analog voltages necessary to modulate the laser beams for printing on the photosensitive material, and can be readily designed by one skilled in the art. Once the appropriate information has been obtained by print engine interface unit 40, this information is sent onto printer 20 for printing on the photosensitive material as previously discussed.

Figure 3:
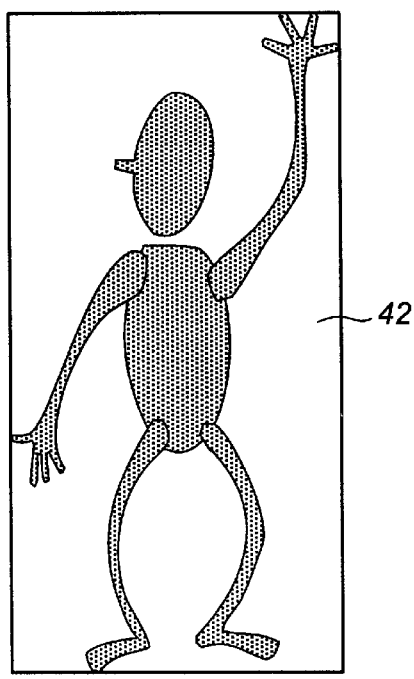
FIG. 3 is a view of an image, which is to be manipulated in accordance with the present invention.
Figure 4:
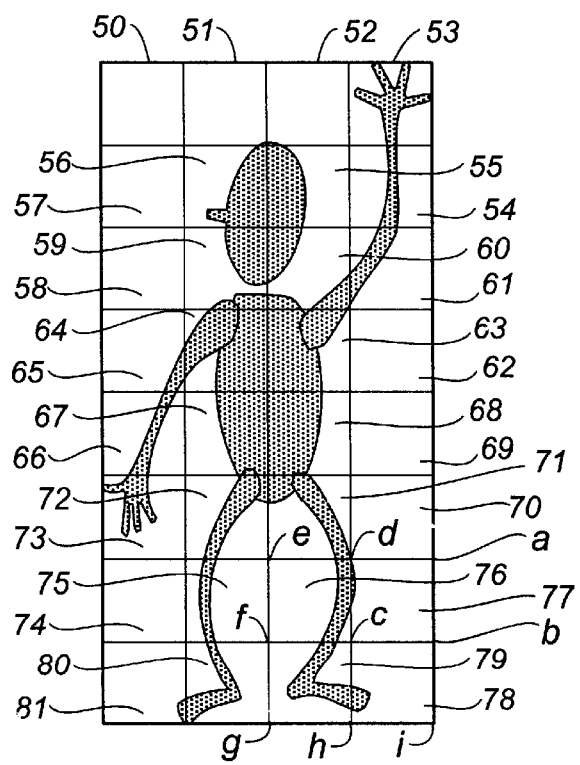
FIG. 4 is a view similar to FIG. 3 illustrating how the image of FIG. 3 is broken down into image segments for manipulation.

The central processing unit 30, in addition to managing various image processing units 32,34,36, also provides instructions to the print engine interface unit 40, and also sends the information digital data to the image processing units 32,34,36 in a manner such that image information can be quickly and efficiently manipulated and forwarded onto the print engine interface unit 40. In particular, referring to FIG. 3, there is illustrated an image 42, which has been scanned and appropriately digitized and sent onto central processing unit 30. The central processing unit then takes the image 42 and divides the image 42 into a plurality of image segments 50–81 as illustrated in FIG. 4. Thus, as can be seen, the image 42 is divided up into a plurality of substantially equal image segments, which in the particular embodiment comprises 32 square segments. It is to be understood that the image segments may take a variety of shapes and/or sizes as discussed later herein with respect to FIG. 6a. The image segments 50–81 are preferably distributed substantially equally to all the image processing units provided. In the particular embodiment illustrated, three image processing units are provided. It is to be understood that any desired number of image processing units may be provided and the image segments may also be divided as desired among the various image processing units provided.

For the purpose of clarity, only a few of the image segments 50–81 will be discussed in detail as to how they are manipulated and forwarded to their respective image processing unit. Referring to FIGS. 5a–5c, there is illustrated image segments 76,77,78,79, which are the lower four segments of image 42, illustrated in FIG. 4. These four adjacent segments each have common boundaries with adjacent image segments. In particular, image segments 76 and 77 have a common side which extends between points DC, and segments 76 and 79 have a common side by extending between points CF. Segments 79 and 78 have a common side which extends between points CH, and finally, image segments 77 and 78 have a common side which extends between points BC. As previously discussed, each of the image segments 50–81 are sent to one of the respective image processing units, however, along with that particular segment, a small boundary region of the next adjacent segment is also forwarded to the image-processing unit. For example, referring to FIG. 5a, there is illustrated segment 77 having additional overlapping boundary regions/areas segments 90, 91 and 92. Overlapping boundary region 90 includes a portion of the adjacent segment 70 and a small portion segment 76. Overlapping boundary segment 91 includes a portion of image segment 76 and a small portion of adjacent segments 76, 78 and 79. Likewise, overlapping segment 92 includes that portion of adjacent segment 78 and a small portion of image segment 76 and 79. Thus, in addition to the image segment 77 that is forwarded to the image processing unit, a portion of the adjacent boundary region of the adjacent segments is also forwarded. Thus, segment 77 has a boundary section which include a portion of segments 70,71,76,78, 79. In a like manner, the remaining image segments 76,79,78 include overlapping regions of the adjacent segments. Thus, segment 76 includes overlapping regions 101,102,103,104, which includes portions of the adjacent segments 70,71,72,75,80,79,78,77. FIG. 5c illustrates segment 79 with adjacent overlapping boundary regions 107,108,109, which include portions of the adjacent image segments 75,76,77,78,80.

In a like manner, image segment 78 includes overlapping boundary regions 113,115, which include portions of adjacent segments 76,77,79. While segments 76,77,78,79 each have an adjacent corner C as illustrated in FIGS. 5a–5d, when each of them have an overlapping region, each of them has a new corner C"C'C"'C"", respectively, which do not coincide with each other, but provide new boundary conditions. Thus, when the images for each of the segments are sent to their respective image processing unit, the image manipulation occurs, not only for the actual desired segment, but also extends into the region of the next adjacent image segment. This is done because the vast majority of image processing algorithms in use today require the data for the pixel being processed as well as that of its adjacent neighbors. For example spatial algorithms such as affine warping, cropping and trapping, filter operations involving convolution, etc. require overlapping segments. Therefore, if an image processing algorithm of a type commonly in use today is to be applied to a plurality of image segments, each of the individual segments must include boundary data from its adjacent segments so that when the segments are later recombined, no anomalies are provided in common borders between adjacent image segments. Thus, as the appropriate algorithms are applied to each of the adjacent segments, when they are recombined later, no visual artifact will be observed at the boundary between adjacent image segments. Thus, when the images are recombined, they will produce the image as illustrated in FIG. 3, except that the image will have been manipulated in accordance with the instructions provided.

The present invention allows for very quick processing of the image. By processing different portions of the image simultaneously, image manipulation can be accomplished very quickly. The more processing units that are provided, the faster the image manipulation can occur. Thus, the present invention allows printing of images in substantially real time. As each unit of image manipulation is completed, it can be delivered to and printed by the printer 20. For example, as each line image data is complete for the laser printer 20, that information is immediately forwarded to the printer. This allows the device to require less memory, which can result in less cost to manufacture the device. This advantage is of particular value to devices in the photofinishing field, especially with devices such as mini-labs where printing of images occur shortly after the images have been scanned by the scanner in the minilab and where high quality digital images are desired. This type of system allows the device to maintain printing with a minimal amount of memory and maintain an efficient work flow. An image data stream can be maintained that can keep up with the speed of the printer. Additionally, the present invention allows manipulation of relatively high resolution digital images, even in moderate speed printers, for example, digital images having 512 DPL (dots per linear inch), printed at rates in the range of 1100 prints per hour, having a size of 4 inches by 6 inches (10.16 cms by 15.24 cms). This advantage is also very useful in high speed photographic printers which operate at very high rate, for example, printing of images at a rate in excess of 15000 prints per hour having a size of 4 inches by 6 inches (10.16 cms by 15.24 cms).

In addition to providing substantially seamless boundaries between adjacent image segments as they are recombined together, the present invention allows images to be made of indefinite length with no visual artifact as long as the appropriate image data is supplied.

In order to more clearly understand the operation of the invention the brief description of the invention will now be discussed.

As previously noted, an image is obtained and forwarded onto the digital processing section. In the particular embodiment illustrated, the image is obtained from a scanner, however, appropriate digital inputs may be provided which may be obtained from disk, internet, or any other source as long as there is provided a digital record of an image, for example, the image illustrated in 42. The image 42 is forwarded to central processing unit 30 and is divided up in the appropriate number of segments as either preprogrammed or decided by the central processing unit in accordance with an appropriate algorithm. The segments are then sent to their respective central image processing unit 32, 34 and 36. At the same time information is provided from the central processing unit 30 to print engine interface 40. For example, the central processing unit will tell the print engine interface that appropriate images have been sent to the central image processors and that certain image segments have been forwarded to image processing units in the particular location of each image segment, and the order needed to recombine the image. The print engine interface will call upon the appropriate image processing unit 32, 34, 36 in order to obtain the appropriate image segment required at that time necessary to recombine the image. However, once the image segments, including the overlapping boundary regions as illustrated in FIGS. 5a–5d have been forward to the print engine interface 40, only that portion indicated by the original boundaries between adjacent image segment will be obtained. For example, only that region bounded by points A, B, C and D will be obtained for image segment 77 and the image bounded by points C, D, E and F for segment 76 and image information for segment 78 will be obtained by that portion bounded by corners I, B, C, and H and those portions for segment 79 bounded by points H, C, F and G; the overlapping regions of each of the segments which were used in the algorithm calculations are discarded as part of the recombination process. Thus, as the image segments are recombined a complete image such as that illustrated in 43 will be provided. The information is obtained from each of the image processors as needed to recombine the image. This may be done in real time such that the information required for printing is obtained as soon as it is required by the printer from the appropriate image processing units through the use of the print engine interface unit 40. The print engine interface unit 40 keeps track as to the amount of digital data required or needed by the printer 20. Therefore, as the printer requires more data for printing, the print engine interface unit will call up the required data from the image processing units. Thus, as each line of digital data of the recombined image 42 is completed, it is sent on to printer 20. Therefore, any length or size image may be obtained and printed onto the forth set material. Thus, if the photosensitive material provided in the digital printer 20 is in roll form, an image of indefinite length may be printed thereon.

Figure 6A:
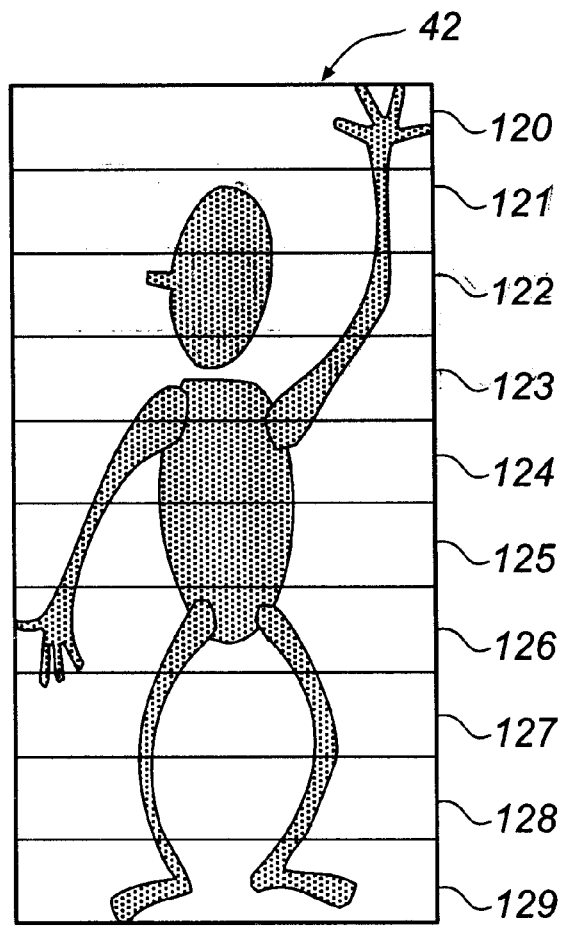
FIG. 6a is view similar to FIG. 4 illustrating an alternate way in which the image may broken down in to image segments.
Figure 6B:
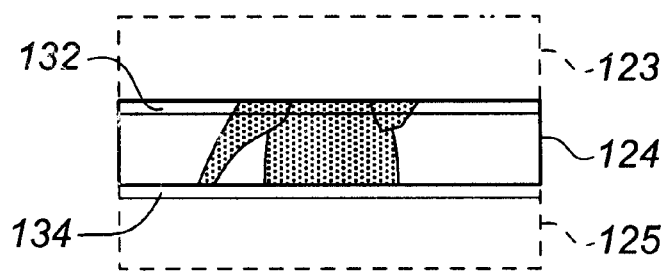
FIG. 6b is an enlarged view illustrating one of the segments as it is sent to one of the image processing units.

Referring to FIG. 6a, there is illustrated an alternate method of dividing the image 42 into different size and shape image segments. In this embodiment, the image 42 is divided in ten (10) adjacent image segments 120–129, each having a substantially rectangular configuration. FIG. 6b illustrates an enlarged view of segment 124 illustrating overlapping image regions 132, 134, with respect to adjacent image segments 123 and 125. Image segments 120–129 are manipulated in the same manner as discussed with respect to image segments 50–81 and reassembled in a like manner. It is, of course, understood that image 42 may be divided in any number of image segments having any desired shape.

It is to be understood that various changes in modifications may be made without parting from the scope of the present invention. The present invention being defined by the following claims.

PARTS LIST

10 Apparatus
12 Central processing unit
14 Film processor
16 Film scanner
18 Digital processing section
20 Digital printer
22 Supply magazine
24 Paper processor 26 Collator
30 Central processing unit
32,34,36 Image processing units
40 Print engine interface unit
41 Bus
43 Recombined image segments
44 Bus
50–81 Image segments
90–92 Regions/areas
101–104 Overlapping region
107–109 Overlapping boundary region
113,115 Overlapping boundary region
120–129 Image segments
132,134 Overlapping image region

What is claimed is:

1. A method of processing digital image data of an image, comprising the steps of:
   a) obtaining a digital record of an image;
   b) segmenting the digital record into a plurality of image segments, each of the image segments having an image region and an overlapping region with respect to adjacent image segments;
   c) distributing the image segments to at least two image processing units;
   d) said at least two image processing units manipulating each of the image segments of the digital record; and
   e) recombining the image regions of each of the image segments for reformation of the image.

2. A method according to claim 1 further comprising the step of printing a writing segment as soon as it is completed by said at least two image processing units.

3. A method according to claim 2 wherein said writing segment comprises a line of digital data.

4. A method according to claim 1 further comprising the step of providing a communication bus between said at least two image processing units and a print engine interface unit.

5. A method according to claim 4 wherein said at least two image processing units comprises two image processing units.

6. A method according to claim 4 wherein said bus connects said print engine interface unit to at least four image processing units.

7. A method according to claim 1 wherein a central processing unit is provided for segmenting the digital record and for sending the image segments to at least two image processing units and for providing data to a print engine interface unit.

8. A method according to claim 1 further comprising the step of:
   providing substantially continuous data to a printer in substantially real time such that data may be continuously recorded onto a media.

9. An apparatus for manipulated digital image data, comprising a central processing unit for managing a digital image record for at least one image, at least two image processing units in communication with said central processing unit, and a print engine interface unit in communication with said central processing unit, said central processing unit segmenting said digital record into a plurality of image segments and forwarding said image segments to said at least two image processing units, each of said image segments having an image region and an overlapping region with respect to adjacent segments, said at least two image processing units manipulating the image segments, said print engine interface unit obtaining information from said central processing unit such that appropriate digital data may be obtained from said at least two image processing units for recombining of the image using the image region of each of the image segments and for forwarding the recombined image to a printing device.

10. An apparatus according to claim 9 wherein a bus connects said print engine interface unit and said at least two image processing units for allowing data to be quickly and efficiently communicated therebetween.

11. A method of processing digital image data of an image, comprising the steps of:
   a) obtaining a digital record of an image;
   b) segmenting the digital record into a plurality of image segments, each of the plurality image segments comprising an image region and an overlapping region with respect to adjacent image segments;
   c) distributing said image segments to at least two image processing units;
   d) manipulating each of the image segments of the digital record by said at least two image processing units; and
   e) recombining the image regions of each of said image segments for reformation of said image.

12. A method according to claim 11 further comprising the step of printing a writing segment as soon as it is completed by said at least two image processing units.

13. A method according to claim 12 wherein said writing segment comprises a line of digital data.

14. A method according to claim 11 further comprising the step of providing a bus for communication between said at least two image processing units and a print engine interface unit.

15. A method according to claim 14 wherein said at least two image processing units comprises three image processing units.

16. A method according to claim 14 wherein said bus connects said print engine interface unit to at least four image processing units.

17. A method according to claim 11 wherein a central processing unit is provided for managing data being sent to at least two image processing units and a print engine interface unit.

18. A method according to claim 11 further comprising the step of:
   providing substantially continuous data to a printer in substantially real time such that data may be continuously recorded onto a media.

19. An apparatus for manipulated digital image data, comprising a central processing unit for managing a digital record for at least one image, at least two image processing units in communication with said central processing unit, and a print engine interface unit in communication with said central processing unit, said central processing unit segmenting the digital record into a plurality of image segments for forwarding on to said at least two image processing units, each of the plurality of image segments comprising an image region and an overlapping region with respect to adjacent image segments, said at least two image processing units manipulate the image segments, said print engine interface unit obtaining information from said central processing unit such that appropriate digital data may be obtained from said at least two image processing units, for recombining of said image using said regions of said plurality of image segments.

20. An apparatus according to claim 19 wherein a bus connects said print engine interface unit and said at least two image processing units for allowing data to be quickly and efficiently communicated therebetween.

21. A method of processing digital image data of an image in a photographic printer, comprising the steps of:
   a) obtaining a digital record of an image;
   b) segmenting the digital record into a plurality of image segments, each of said image segments having an image region and an overlapping region with respect to adjacent image segments;
   c) distributing said image segments to at least two image processing units;
   d) said at least two image processing units manipulating each of said image segments of said digital record; and
   e) recombining the image regions of each of said image segments for reformation of said image.

22. A method according to claim 21 further comprising the step of printing a writing segment as soon as it is completed by said at least two image processing units.

23. A method according to claim 22 wherein said writing segment comprises a line of digital data.

24. A method according to claim 21 further comprising the step of providing a communication bus between said at least two image processing units and said print engine interface unit.

25. A method according to claim 24 wherein said at least two image processing units comprises two image processing units.

26. A method according to claim 24 wherein said bus connects said print engine interface unit to at least four image processing units.

27. A method according to claim 21 wherein a central processing unit is provided for segmenting the digital record and for sending the image segments to at least two image processing units and for providing data to said print engine interface unit.

28. A method according to claim 21 further comprising the step of:
   providing substantially continuous data to a printer in substantially real time such that data may be continuously recorded onto a media.

29. A digital printer for printing onto a photographic material, said printer comprising a central processing unit for managing a digital image record for at least one image, at least two image processing units in communication with said central processing unit, and a print engine interface unit in communication with said central processing unit, said central processing unit segmenting said digital record into a plurality of image segments and forwarding said image segments to said at least two image processing units, each of said image segments having an image region and an overlapping region with respect to adjacent segments, said at least two image processing units manipulating the image segments, said print engine interface unit obtaining information from said central processing unit such that appropriate digital data may be obtained from said at least two image processing units for recombining of the image using said image regions of said plurality of image segments and for forwarding the recombined image to a device.

30. An apparatus according to claim 29 wherein a bus connects said print engine interface unit and said at least two image processing units for allowing data to be quickly and efficiently communicated therebetween.

31. A method of processing digital image data of an image in a photographic printer, comprising the steps of:
   a) obtaining a digital record of an image;
   b) segmenting the digital record into a plurality of image segments, each of said plurality of image segments comprising an image region and an overlapping region;
   c) distributing said image segments to at least two image processing units;
   d) manipulating each of the image regions of the digital record by said at least two image processing units; and
   e) recombining the image regions of each of said image segments for reformation of said image.

32. A method according to claim 31 further comprising the step of printing a writing segment as soon as it is completed by said at least two image processing units.

33. A method according to claim 32 wherein said writing segment comprises a line of digital data.

34. A method according to claim 31 further comprising the step of providing a bus for communication between said at least two image processing units and a print engine interface unit.

35. A method according to claim 34 wherein said at least two image processing unit comprises three image processing units.

36. A method according to claim 34 wherein said bus connects said print engine interface unit to at least four image processing units.

37. A method according to claim 31 wherein a central processing unit is provided for managing data being sent to at least two image processing units and a print engine interface unit.

38. A method according to claim 31 further comprising the step of:
   providing substantially continuous data to a printer in substantially real time such that data may be continuously recorded onto a media.

39. A digital printer for printing onto a photographic material, comprising a central processing unit for managing a digital record for at least one image, at least two image processing units in communication with said central processing unit, and a print engine interface unit in communication with said central processing unit, said central processing unit segmenting the digital record into a plurality of image segments for forwarding on to said at least two image processing units, each of said plurality of said image segments having an image region and an overlapping region, said at least two image processing units manipulate the image segments, said print engine interface unit obtaining information from said central processing unit such that appropriate digital data may be obtained from said at least two image processing unit for combining of said image region of said plurality of image segments.

40. An apparatus according to claim 39 wherein a bus connects said print engine interface unit and said at least two image processing units for allowing data to be quickly and efficiently communicated therebetween.

* * * * *